United States Patent [19]

Vieselmeyer

[11] Patent Number: 5,688,102
[45] Date of Patent: Nov. 18, 1997

[54] TREE MOVING AND PLANTING APPARATUS

[76] Inventor: Lee R. Vieselmeyer, P.O. Box 36, Davenport, Nebr. 68335

[21] Appl. No.: 684,151

[22] Filed: Jul. 19, 1996

[51] Int. Cl.$^6$ .................................................. B66C 1/00
[52] U.S. Cl. .................... 414/724; 414/666; 414/667; 414/670; 414/671; 414/672
[58] Field of Search .................. 414/724, 664–672, 414/685; 187/237

[56] References Cited

U.S. PATENT DOCUMENTS

| | | | |
|---|---|---|---|
| 3,110,477 | 11/1963 | Campbell | 254/132 |
| 3,127,209 | 3/1964 | Faust et al. | 294/88 |
| 3,163,458 | 12/1964 | Brandt, Jr. | 294/88 |
| 3,203,567 | 8/1965 | Huitfeldt | 214/652 |
| 3,223,267 | 12/1965 | Stammen | 414/671 |
| 3,285,651 | 11/1966 | Ellis | 294/104 |
| 3,302,802 | 2/1967 | Muller | 214/1 |
| 3,311,350 | 3/1967 | Irwin | 254/132 |
| 3,322,455 | 5/1967 | Gressbach | 294/81 |
| 3,862,776 | 1/1975 | Sims et al. | 294/104 |
| 3,866,780 | 2/1975 | Miller et al. | 414/665 X |
| 4,318,661 | 3/1982 | Helm | 414/607 |
| 5,374,156 | 12/1994 | Simpson et al. | 414/671 X |

*Primary Examiner*—Donald W. Underwood
*Attorney, Agent, or Firm*—Zarley, McKee, Thomte, Voorhees & Sease; Mark D. Frederiksen

[57] ABSTRACT

A hydraulic lift attachment is connected to the lift arms of a loading vehicle, and includes a base plate with a pair of brackets thereon for pivotal attachment to the lift arms of the loading vehicle. A first jaw member is rigidly connected to the base plate adjacent one end thereof and projects forwardly beyond the forward edge of the base plate. A second jaw member is operably connected to the base plate for selective pivotal movement about a pivot axis, and also projects forwardly beyond the forward edge of the base plate. The second jaw member is also operably connected for selective slidable movement of the pivot axis towards and away from the first jaw member. A first hydraulic cylinder is connected between an intermediate point on the second jaw and a fixed point on the base plate, so as to pivot the second jaw about a pivot axis. A second hydraulic cylinder is connected between the pivot axis of the second jaw and a fixed point on the base plate, so as to selectively slide the pivot axis along the slot. An elongated tine is adjustably and removably connected to each jaw member to permit selective pivotal movement about an axis which is parallel to both the longitudinal axes of the jaw member and associated tine.

13 Claims, 4 Drawing Sheets

TREE MOVING AND PLANTING APPARATUS

TECHNICAL FIELD

The present invention relates generally to attachments used on loading vehicles and more specifically, to a hydraulic lift attachment which may be used for planting and removing trees and for working with pallets.

BACKGROUND OF THE INVENTION

In nursery and gardening work, transportation of trees, large plants, large rocks, and the like, from the nursery to at planting site generally requires the utilization of a loading vehicle. The loading vehicle must be capable of transporting a tree without damaging the ball of roots and earth at the base of the tree. Although specialized loading vehicles have been used for this purpose, they are not generally cost effective for any but the largest operations because of their highly specialized and limited functions. Tree planting attachments for conventional loading vehicles have also proven unsatisfactory for a number of reasons. Some of the devices, like the special loading vehicles, are far too complex and expensive for general nursery use. Others, although less expensive, have proven to be awkward to attach to a lifting vehicle or are incapable of performing all of the operations necessary for transporting and planting trees.

A tree which is to be placed at a remote site must first be extracted from the ground with most of the roots left intact. In many cases, the tree must then be loaded onto a truck for transportation to the remote site, a step which requires a tree to be lifted vertically into the bed of the truck. At the planting site, the tree must be lifted out of the truck, and transported to the exact planting location. The tree must then be placed in a planting hole and must finally be set firmly in the hole to prevent tilting during back filling and subsequent settling. A desirable lift attachment must be capable of performing all of these functions. The lift attachment should be adaptable to farm tractors, skid loaders, and other front-end loader type vehicles commonly associated with nursery work. The device should also be easily attached or removed from the loading vehicle. The attachment should be adjustable for various sizes of trees, as well as for use with rocks and large pots. Finally, the attachment should have adjustable jaws for various shapes of objects, and for use in lifting and moving pallets.

SUMMARY OF THE INVENTION

It is therefore a general object of the present invention to provide a hydraulic lift attachment for loading vehicles which may be used to plant or transport trees, and which may also be used for general loading operations.

It is a further object of the present invention to provide a hydraulic lift attachment for loading vehicles which allows an operator to keep a tree in a vertical position during lifting and transportation.

Another object of the present invention is to provide a hydraulic lift attachment which allows a tree to be gripped about its girth or base without damage to the tree trunk.

Yet a further object of the present invention is to provide a hydraulic lift attachment which allows a tree to be firmly pressed into a planting excavation.

Still another object of the present invention is to provide a hydraulic lift attachment which may be easily attached to front-end loading vehicles.

It is a further object of the present invention to provide a hydraulic lift attachment which has an adjustable jaw for use with various sizes of trees.

Still a further object of the present invention is to provide a hydraulic lift attachment which is inexpensive to produce, sturdy in construction and easily maintained.

These and other objects will be apparent to those skilled in the art.

The hydraulic lift attachment of the present invention is connected to the lift arms of a loading vehicle, and includes a base plate with a pair of brackets thereon for pivotal attachment to the lift arms of the loading vehicle. A first jaw member is rigidly connected to the base plate adjacent one end thereof and projects forwardly beyond the forward edge of the base plate. A second jaw member is operably connected to the base plate for selective pivotal movement about a pivot axis, and also projects forwardly beyond the forward edge of the base plate. The second jaw member is also operably connected for selective slidable movement of the pivot axis towards and away from the first jaw member. A first hydraulic cylinder is connected between an intermediate point on the second jaw and a fixed point on the base plate, so as to pivot the second jaw about a pivot axis. A second hydraulic cylinder is connected between the pivot axis of the second jaw and a fixed point on the base plate, so as to selectively slide the pivot axis along the slot. An elongated tine is adjustably and removably connected to each jaw member to permit selective pivotal movement about an axis which is parallel to both the longitudinal axes of the jaw member and associated tine.

DESCRIPTION OF THE PREFERRED EMBODIMENT

Figure 1:
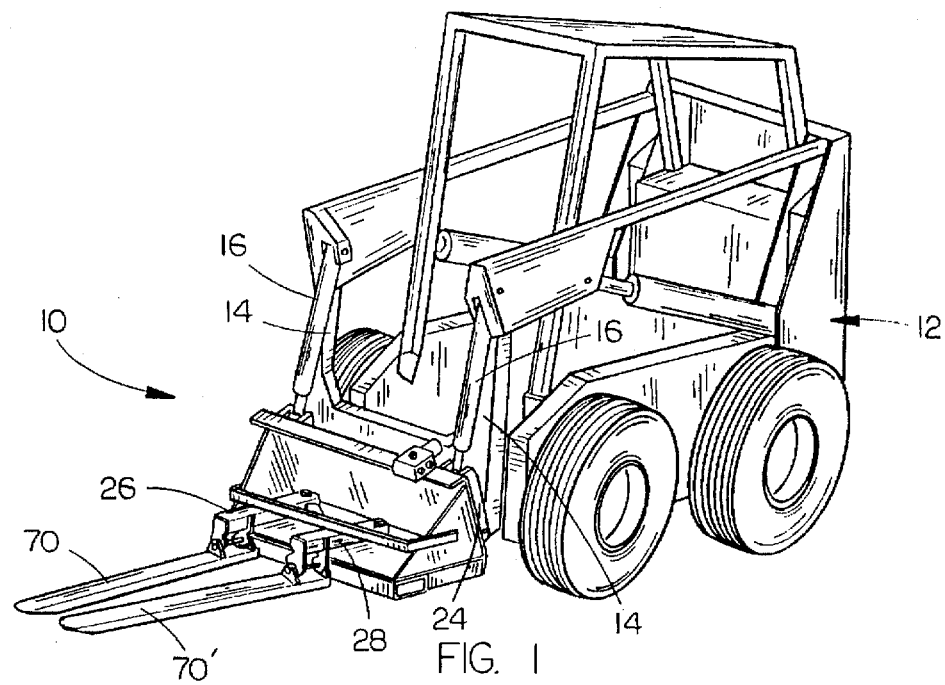
FIG. 1 is a perspective view of the hydraulic lift attachment of this invention mounted on a loading vehicle.

Referring now to the drawings, in which identical or corresponding parts are identified with the same reference numeral, and more particularly to FIG. 1, the hydraulic lift attachment of the present invention is designated generally at 10 and is designed for attachment to a loading vehicle 12 such as a front-end loading farm tractor, bucket loader, or skid loader. A common feature of loading vehicles of this type are parallel lift arms 14 for raising and lowering a bucket or other attachment, and control arms 16 for pivoting the attachment to facilitate dumping and other operations.

Figure 2:
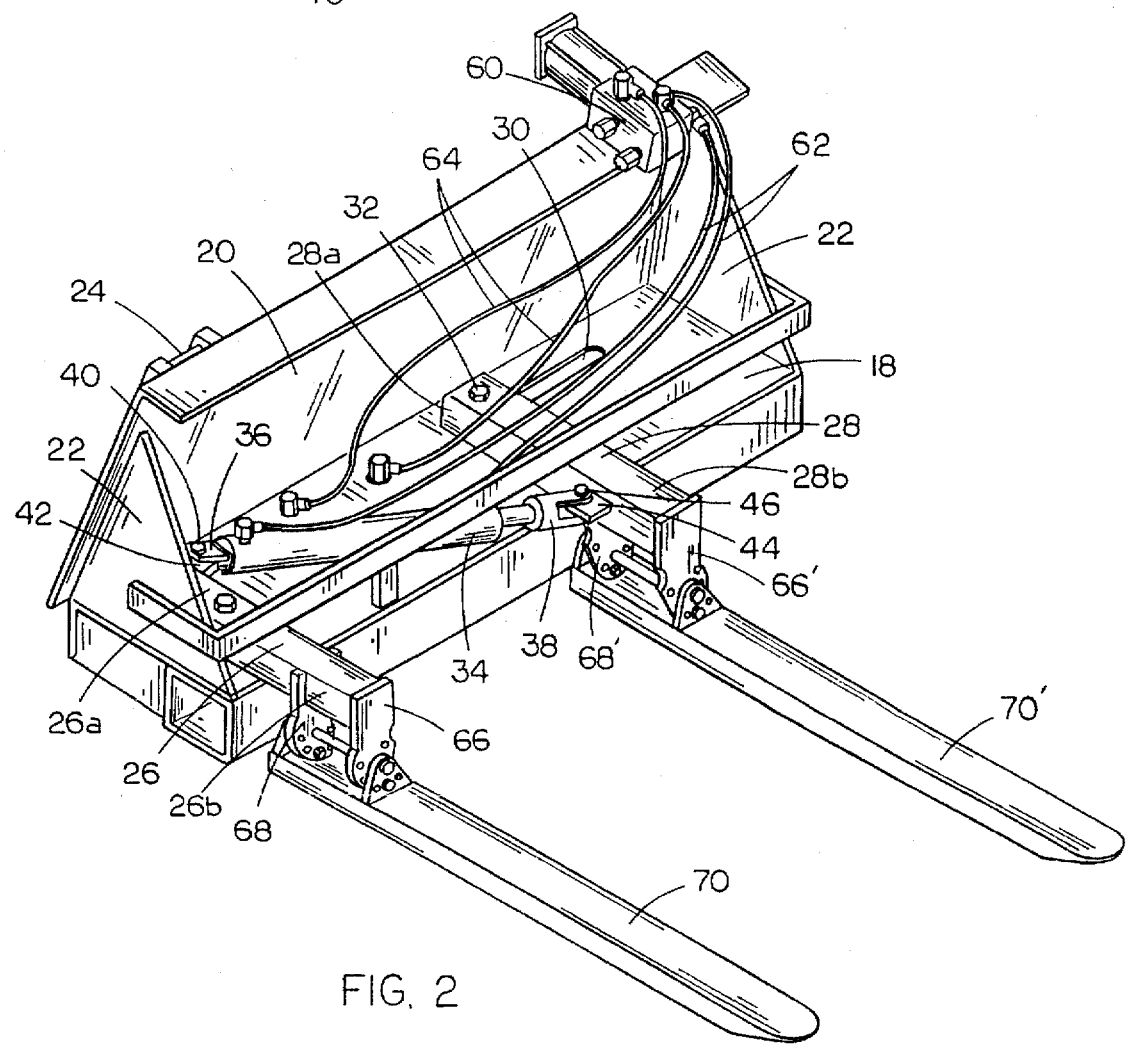
FIG. 2 is an enlarged perspective view of the invention.

Referring now to FIG. 2, hydraulic lift attachment 10 includes a transverse base plate 18 having an upstanding back plate 20 projecting from the rearward edge thereof. A pair of opposing side gusset plates 22 are mounted between back plate 20 and base plate 18 as shown in the drawings.

Figure 5:
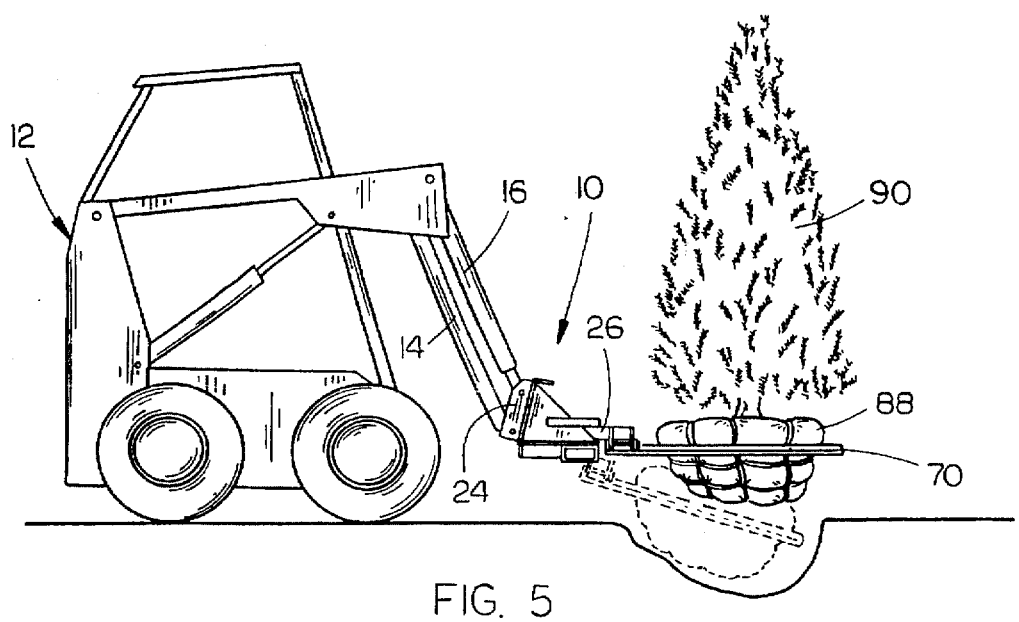
FIG. 5 is an elevational view of the hydraulic lift attachment mounted on a loading vehicle and being used to plant a tree.

A pair of attachment brackets 24 are mounted to the rearward surface of back plate 20, and are designed to permit connection of lift arms 14 and control arms 16 to hydraulic lift attachment 10. As shown in FIGS. 1 and 5, lift arms 14 are pivotally connected to the lower ends of brackets 24, and control arms 16 are pivotally connected to the upper ends of attachment brackets 24. It can be seen that the pivotal attachment of hydraulic lift attachment 10 to loading vehicle 12 by means of the attachment brackets 24 allows the pitch of base plate 18 to be varied with respect to loading vehicle 12 by extension or retraction of control arms 16.

Figure 3:
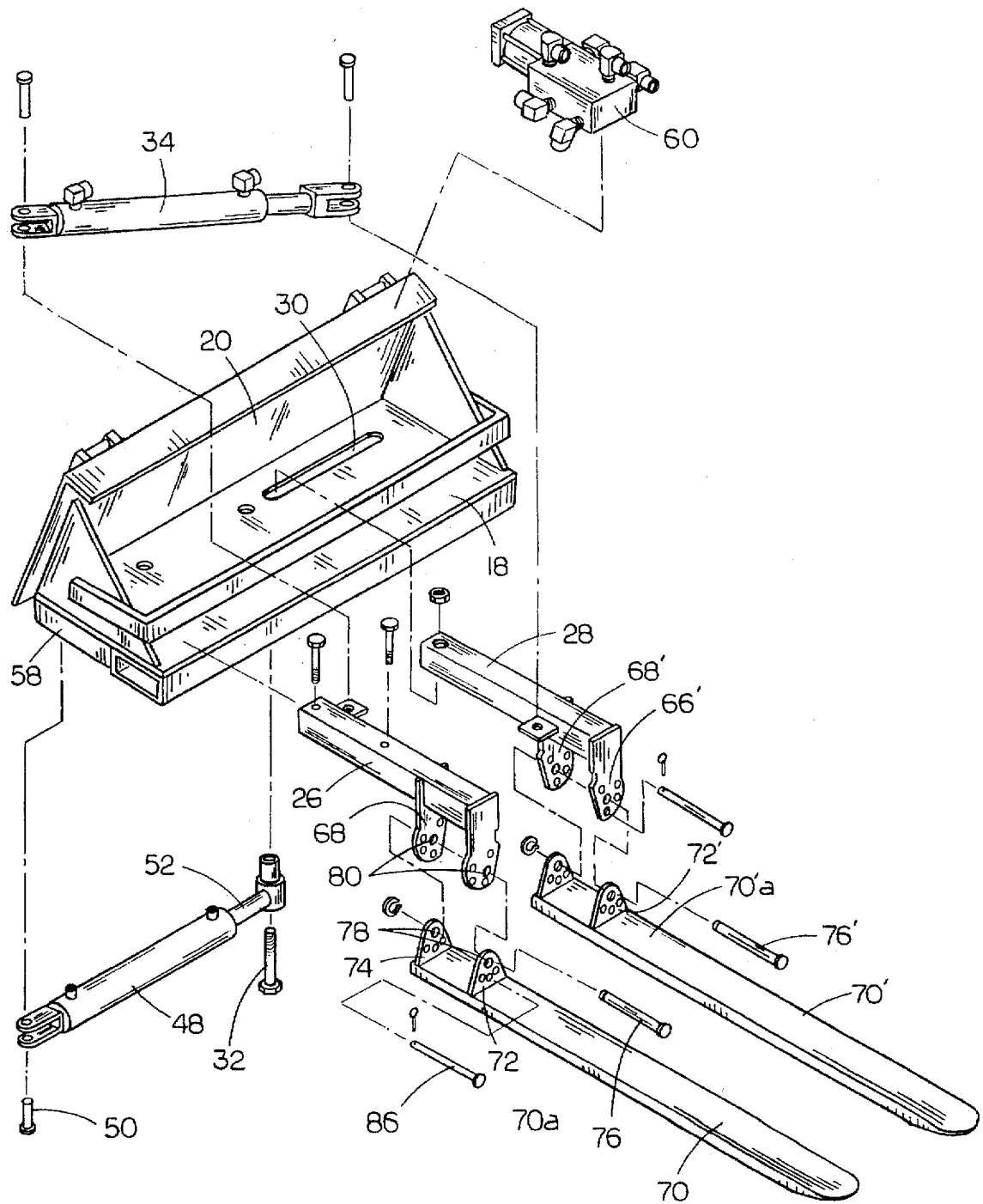
FIG. 3 is an exploded perspective view of the hydraulic lift attachment of this invention.
Figure 4:
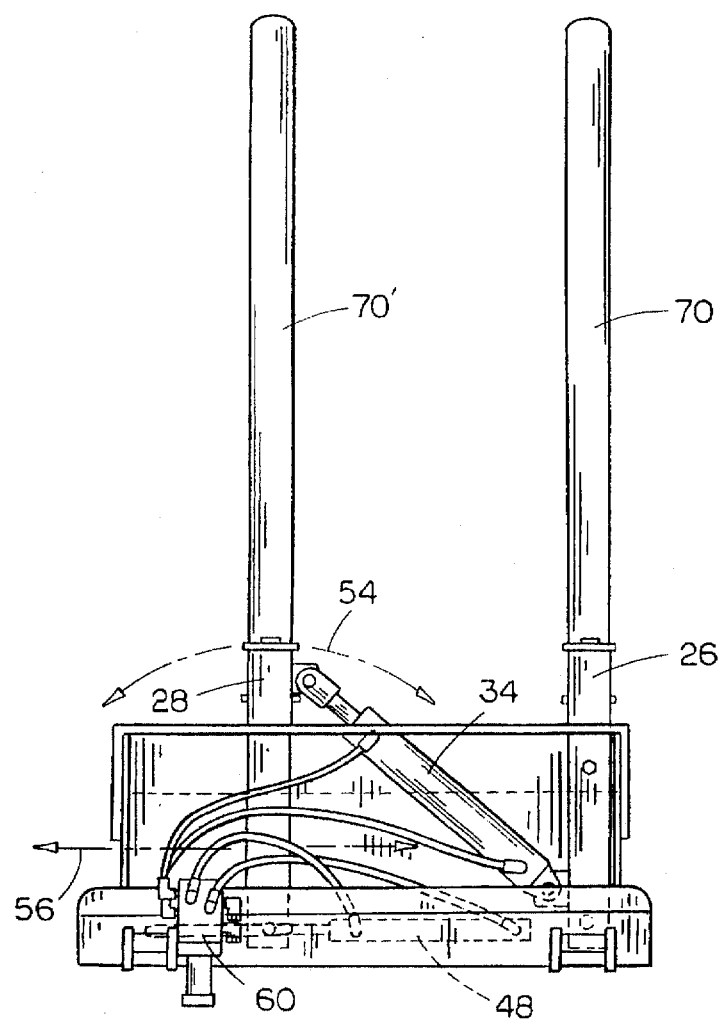
FIG. 4 is a top view of the hydraulic lift attachment.

As shown by FIGS. 2, 3 and 4, a fixed jaw member 26 made from angle iron, structural steel or the like, is bolted or otherwise rigidly attached to the upper surface of base plate 18. Fixed jaw member 26 is oriented perpendicular to the longest dimension of base plate 18 and is positioned near one of the outboard sides. An operable jaw member 28 is similar in size and construction to fixed jaw member 26, and is pivotally and slidably pinned through a slot 30 in base plate 18 by means of a pin 32.

A double acting hydraulic cylinder unit 34 is provided with a cylinder clevis 36 and piston clevis 38 to facilitate attachment. Cylinder clevis 36 is attached with a pivot pin 40 to a pivot knuckle 42. The pivot knuckle 42 is in turn welded or otherwise permanently attached to fixed jaw member 26 at a rearward end 26a near back plate 20. A second pivot knuckle 44 is similarly attached to the inwardly directed side of operable jaw member 28 at a point near the forward end 28b of operable jaw member 28. Piston clevis 38 is attached to pivot knuckle 44 with a pivot pin 46.

Thus, it may be seen that an operator may cause operable jaw member 28 to pivot inwardly towards or outwardly away form fixed jaw member 26 by actuating hydraulic cylinder unit 34. In the preferred embodiment, operable jaw member 28 may be moved inward to a position with the forward end 28b converging with fixed jaw member 26 and may also be pivoted outward to a position diverging from fixed jaw member 26.

Referring now to FIGS. 3 and 4, a second hydraulic cylinder 48 is pivotally connected at one end to the under side of base plate 18, by a pivot pin 50. The piston rod 52 of second cylinder 48 is pivotally connected to the lower end of operable jaw member pivot pin 32, which projects through slot 30. Thus, actuation of second cylinder 48 will slide pivot pin 32 towards or away from fixed jaw member 26, within slot 30. Depending upon whether cylinder 34 or cylinder 48 is actuated, operable jaw member 28 may be pivoted, as shown by arrows 54 in FIG. 4, or have its pivot point moved as shown by arrows 56 in FIG. 4. A lower housing 58 depends from base plate 18 and extends around cylinder 48 to protect it from the ground during operation of hydraulic lift attachment 10.

In the preferred embodiment, a diverter box 60 is mounted on the upper end of back plate 20 and includes at least two pair of inlet and outlet hydraulic lines. Diverter box 60 is hydraulically connected to the conventional hydraulic lines of the vehicle 12, in a conventional fashion. One pair of inlet and outlet hydraulic lines 62 extend from diverter box 60 to first cylinder 34. A second set of inlet and outlet hydraulic lines 64 extend from diverter box 60 to second cylinder 48. Since most vehicles have only one auxiliary set of hydraulic lines, diverter box 60 includes a solenoid (not shown) which allows the operator to dived hydraulic fluid to either hydraulic lines 62 or hydraulic lines 64. In the event that the vehicle 12 includes two auxiliary hydraulic connections, diverter box 60 would not be necessary, and both cylinder 34 and 48 could be operated simultaneously, if so desired.

Referring to FIGS. 2 and 3, fixed jaw 26 has a pair of forward and rearward spaced apart support plates 66 and 68 depending from the forward end 26b thereof. A pair of similar support plates 66' and 68' depend from the forward end of pivot jaw 28b. A pair of identical pallet fork tines 70 and 70' are connected to the support plates 66 and 68, and 66' and 68', respectively, as discussed in more detail hereinbelow.

Each pallet fork tine 70 and 70' has a pair of spaced apart forward and rearward brackets 72 and 74, and 72' and 74', respectively, at their rearward ends 70a and 70'a. A pivot pin 76 is journaled through a pair of apertures 78 in brackets 72 and 74, and corresponding apertures 80 in support plates 66 and 68, such that tine 70 is mounted for pivotal movement about pivot pin 76. A similar pivot pin 76' attaches tine 70' to support plates 66' and 68'.

Referring now to FIGS. 6–9, a plurality of holes 82 are formed through forward support plate 66, each being spaced an equal distance from pivot pin 76, to lie on a circle concentric with the axis of pivot pin 76. Apertures 82' are provided in a similar fashion on forward support plate 66'. In addition, holes 84 are formed through forward bracket 72 of pallet fork tine 70, and spaced the same distance from pivot pin 76 as holes 82, so as to fall along a circle concentric with the pivot axis of pivot pin 76. Similar holes 84' are provided on forward bracket 72' of tine 70'. Similar holes are also provided on the rearward brackets 74 and 74' and rearward support plates 68 and 68', in alignment with holes 82 and 82', 84 and 84'.

Figure 6:
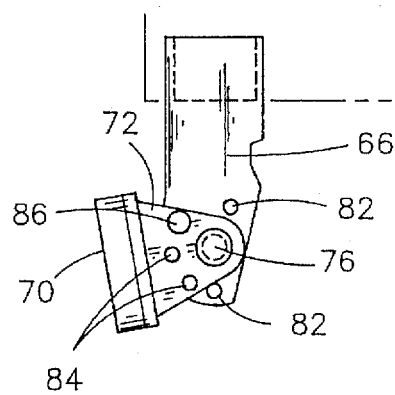
FIG. 6 is a front end view of the tines of the lift attachment, with the tines in a first position.
Figure 6:
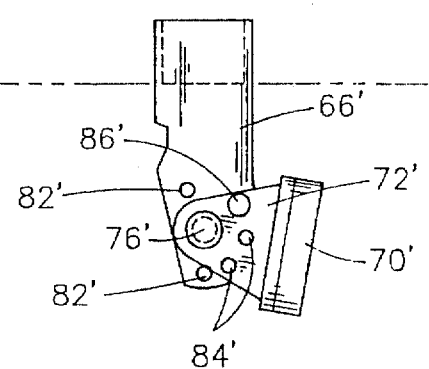
Figure 7:
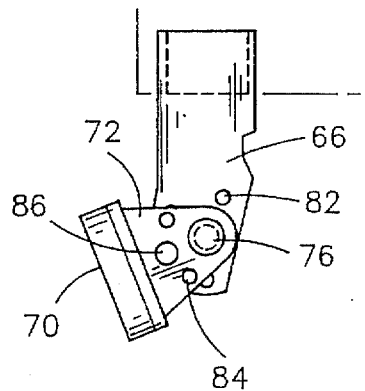
FIG. 7 is a view similar to FIG. 6, with the tines in a second position.
Figure 7:
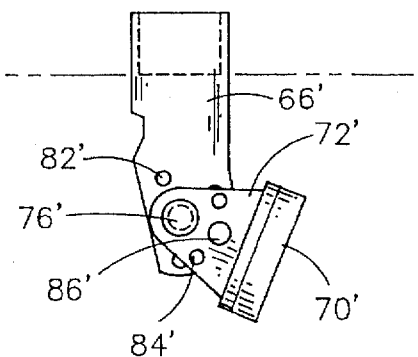
Figure 8:
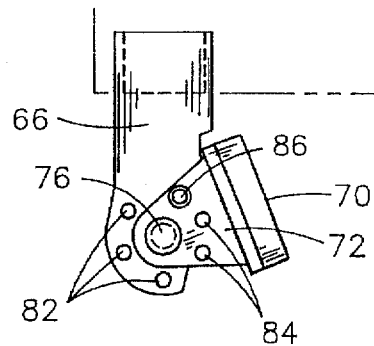
FIG. 8 is a view similar to FIG. 6, with the tines in a third position.
Figure 8:
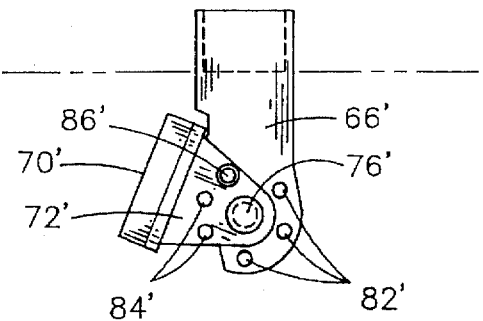
Figure 9:
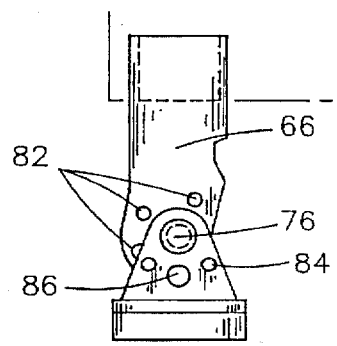
FIG. 9 is a view similar to FIG. 6, with the tines in a fourth position.
Figure 9:
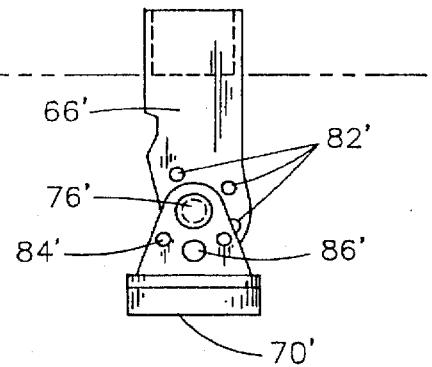

A locking pin 86 is provided which is journaled through a pair of aligned holes 84 and 82 so as to lock tine 70 pivoted into a desired orientation. Pallet fork tines 70 and 70' preferably have flat upper and lower surfaces which may thereby be oriented in a horizontal, coplanar orientation, as shown in FIG. 9. The upper and lower surfaces of tines 70 and 70' may also be oriented at an angle relative to the vertical as shown in FIGS. 6–8, by inserting locking pin 86 through various pairs of aligned holes 82 and 84. Preferably, the upper and lower surfaces of tines 70 and 70' are oriented at an angle of approximately 22° from the vertical, with the planes of the tine upper and lower surfaces intersecting at a position located below the tines. FIG. 7 shows the upper surfaces of the tines positioned in opposing relationship, for supporting large tree root balls therebetween. For smaller tree root balls, the tines can be positioned at a similar angle, but with the lower surfaces of the tines in opposing relationship, as shown in FIG. 8. In this way, a greater variety of sizes of objects may be grasped and lifted by the tines. FIG. 6 shows tines 70 and 70' locked in a position with the top and bottom surfaces oriented at an angle of approximately 10° from the vertical, for lifting and moving tree boxes.

A typical tree planting operation is illustrated in FIGS. 1 and 5. It can be seen that the hydraulic lift attachment 10 may be used to grip the root ball 88 of a tree 90 between tines 70 and 70' of jaw members 26 and 28. Also, tines 70 and 70' may be pivoted to a desired angle from the vertical (using locking pins 86), to provide a better gripping surface on the tines. The control arms 16 of loading vehicle 12 may be extended or contracted to hold tree 90 in a vertically upright position while it is being transported. During plating, tree 90 is first set into a planting excavation and then released by jaw members 26 and 28. The lift arms 14 and control arms 16 are then manipulated to place tines 70 and 70' in a more vertically inclined position. Tines 70 and 70' are then again closed around the earth ball of tree 90 and the lift arms 14 are manipulated to push tree 90 down into the hole. The inward inclination of operable jaw member 28 with respect to fixed jaw member 26 facilitates this process, since the inward inclination tends to prevent the operable jaw member 28 from being obstructed by the side wall of the excavation. Thus tree 90 may be pushed deeper into the hole than by parallel jaws. Once tree 90 is firmly set in the hole, the jaw members 26, 28 are again opened and lift attachment 10 is raised out of the hole.

Whereas the invention has been shown and described in connection with the preferred embodiment thereof, it will be understood that many modifications, substitutions and additions may be made which are within the intended broad scope of the appended claims. Thus, there has been shown and described an improved hydraulic lift apparatus which accomplishes at least all of the above stated objects.

I claim:

1. A hydraulic lift attachment for connection to the lift arms of a loading vehicle, comprising:

a base plate having opposing first and second ends and forward and rearward edges;

attachment means for attaching said base plate to the lift arms of the loading vehicle;

a first jaw member connected to said base plate adjacent the first end thereof and projecting beyond the forward edge of said base plate;

a second jaw member operably connected to said base plate for selective pivotal movement about a pivot axis, said second jaw member projecting beyond the forward edge of said base plate;

said second jaw member operably connected to said base plate for selective slidable movement of said pivot axis towards and away from said first jaw member;

first means for pivoting said second jaw on said pivot axis;

second means for slidably moving the pivot axis of said second jaw member; and an elongated tine removably attached to each said jaw member, with a longitudinal axis of each jaw member parallel to a longitudinal axis of the attached tine, said second jaw member having a pivot pin connected to one end thereof, said pivot pin projecting through a slot in said base plate, said pivot pin forming the pivot axis of said second jaw member.

2. The hydraulic lift attachment of claim 1, wherein said first jaw member is mounted in a fixed position on said base plate.

3. The hydraulic lift attachment of claim 1, wherein said first means for pivoting said second jaw includes a first extensible cylinder operably connected between said second jaw and said base plate, said cylinder operable to pivot said jaw about its pivot axis.

4. The hydraulic lift attachment of claim 1, wherein said means for slidably moving the pivot axis of said second jaw member includes an extensible cylinder operably connected between said pivot pin and said base plate, said cylinder operable to slide said pivot pin within the slot in said base plate.

5. The hydraulic lift attachment of claim 4, wherein said slot in said base plate is generally straight and oriented perpendicular to said first jaw member, such that operation of said cylinder will move the pivot axis of said second jaw member towards and away from said first jaw member.

6. The hydraulic lift attachment of claim 1, wherein said first and second jaw members are substantially coplanar, and said second jaw member is pivotable within the same plane as said first jaw member.

7. A hydraulic lift attachment for connection to the lift arms of a loading vehicle, comprising:

a base plate having opposing first and second ends and forward and rearward edges;

attachment means for attaching said base plate to the lift arms of the loading vehicle:

a first jaw member connected to said base plate adjacent the first end thereof and projecting beyond the forward edge of said base plate;

a second jaw member operably connected to said base plate for selective pivotal movement about a pivot axis, said second law member projecting beyond the forward edge of said base plate;

said second law member operably connected to said base plate for selective slidable movement of said pivot axis towards and away from said first jaw member;

first means for pivoting said second jaw on said pivot axis;

second means for slidably moving the pivot axis of said second law member;

an elongated tine removably attached to each said jaw member, with a longitudinal axis of each jaw member parallel to a longitudinal axis of the attached tine; and further comprising means for adjustably removably attaching each said tine to each said jaw member for selective pivotal movement about a pivot axis oriented parallel to the longitudinal axis of the associated jaw member.

8. The hydraulic lift attachment of claim 7, wherein said first jaw member is mounted in a fixed position on said base plate.

9. The hydraulic lift attachment of claim 7, wherein said second jaw member has a pivot pin connected to one end thereof, said pivot pin projecting through a slot in said base plate, said pivot pin forming the pivot axis of said second jaw member.

10. The hydraulic lift attachment of claim 7, wherein said first means for pivoting said second jaw includes a first extensible cylinder operably connected between said second jaw and said base plate, said cylinder operable to pivot said jaw about its pivot axis.

11. The hydraulic lift attachment of claim 9, wherein said means for slidably moving the pivot axis of said second jaw member includes an extensible cylinder operably connected between said pivot pin and said base plate, said cylinder operable to slide said pivot pin within the slot in said base plate.

12. The hydraulic lift attachment of claim 11, wherein said slot in said base plate is generally straight and oriented perpendicular to said first jaw member, such that operation of said cylinder will move the pivot axis of said second jaw member towards and away from said first jaw member.

13. The hydraulic lift attachment of claim 7, wherein said first and second jaw members are substantially coplanar, and said second jaw member is pivotable within the same plane as said first jaw member.

* * * * *